United States Patent [19]

Stevens

[11] Patent Number: 4,481,837
[45] Date of Patent: Nov. 13, 1984

[54] MULTIPLE SPEED GEAR TRANSMISSION

[75] Inventor: Wallace G. Stevens, Dunlap, Ill.

[73] Assignee: Caterpillar Tractor Co., Peoria, Ill.

[21] Appl. No.: 414,284

[22] PCT Filed: Jul. 12, 1982

[86] PCT No.: PCT/US82/00933
§ 371 Date: Jul. 12, 1982
§ 102(e) Date: Jul. 12, 1982

[87] PCT Pub. No.: WO84/00408
PCT Pub. Date: Feb. 2, 1984

[51] Int. Cl.³ .............................................. F16H 3/22
[52] U.S. Cl. ........................................ 74/342; 74/344
[58] Field of Search ................. 74/341, 342, 343, 344, 74/345, 411–415; 192/18 A, 13 R

[56] References Cited

U.S. PATENT DOCUMENTS

| 795,933 | 8/1905 | Power | 74/345 |
| 841,109 | 1/1907 | Bramley-Moore . | |
| 1,574,082 | 2/1926 | Haggart, Jr. | 74/343 |
| 2,021,404 | 1/1930 | Church | 74/359 |
| 2,110,180 | 12/1935 | Semery | 74/363 |
| 2,246,636 | 2/1940 | Peterson et al. | 74/333 |
| 2,953,943 | 9/1960 | Arnold | 74/342 X |
| 2,966,067 | 12/1960 | Sommer | 74/343 |
| 3,025,711 | 3/1962 | Sommer | 74/342 |
| 3,157,257 | 11/1964 | Root | 192/184 |
| 3,364,793 | 1/1968 | Eastwood | 74/342 X |
| 4,000,662 | 1/1977 | Wolfe | 74/331 |
| 4,033,197 | 7/1977 | Shikiya et al. | 74/344 X |

FOREIGN PATENT DOCUMENTS

| 927158 | 10/1947 | France | 74/342 |
| 0044130 | 3/1980 | Japan | 74/342 |

Primary Examiner—Allan D. Herrmann
Attorney, Agent, or Firm—Charles E. Lanchantin, Jr.

[57] ABSTRACT

A multiple speed gear transmission (10) of the sliding gear type includes an input shaft (12) disposed on a first axis (14), and a layshaft (16) disposed on a second axis (18) and having a forward gear (26), a reverse gear (28) and first and second drive gears (124,122) connected for joint rotation therewith. A reverse idler gear (54) is connected to the reverse gear (28), and a first sliding gear (82) is used for connecting the input shaft (12) to either the forward gear (26) or the reverse idler gear (54) and driving the layshaft (16) in either direction of rotation. An output shaft (44) disposed on the first axis (14) is selectively connected to one of the first and second drive gears (124,122) by second and third sliding gears (102,104) respectively. Five forward and four reverse speeds can be provided by the transmission (10) using four conveniently shiftable coupling elements (82,98,100,128).

8 Claims, 2 Drawing Figures

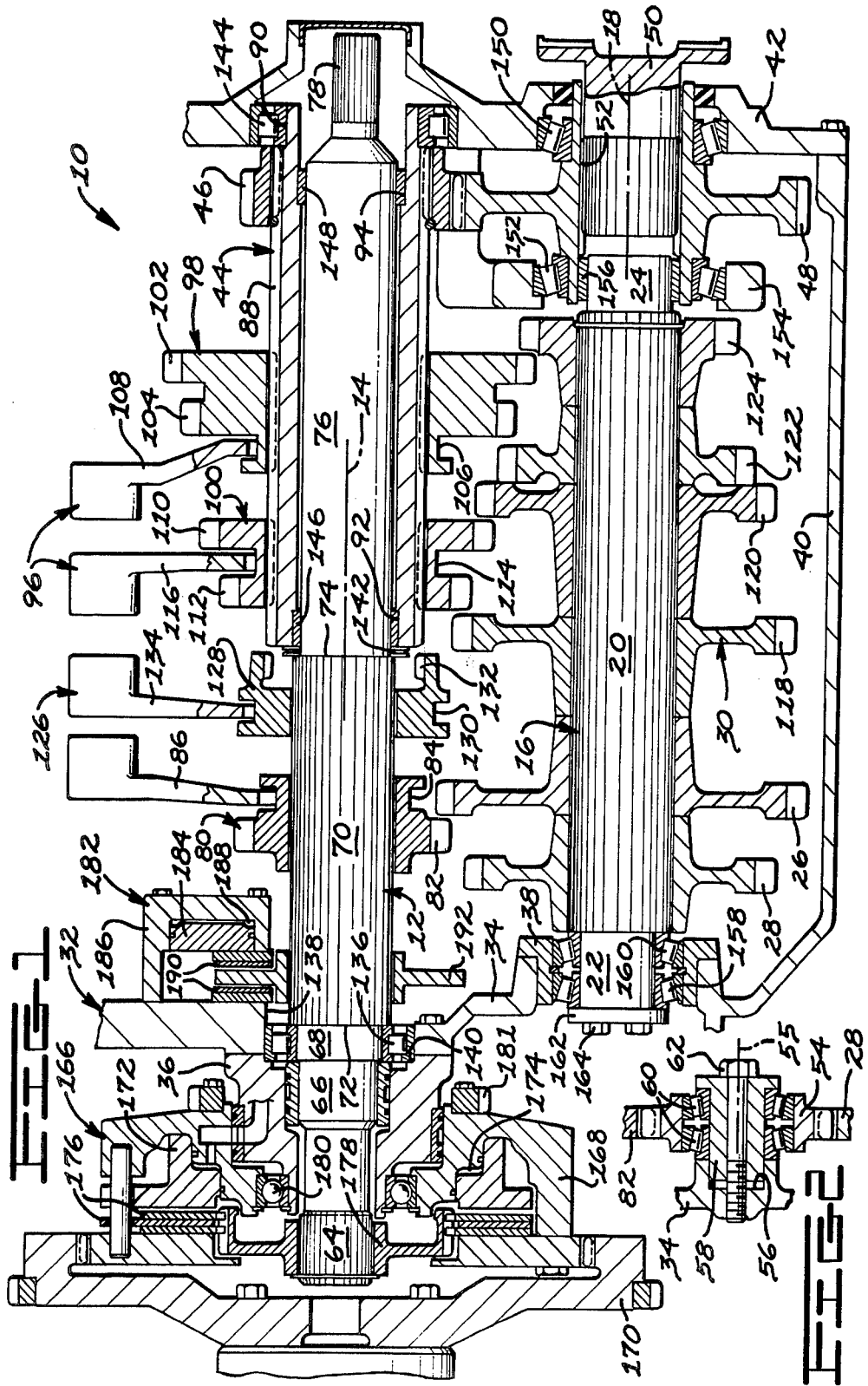

MULTIPLE SPEED GEAR TRANSMISSION

DESCRIPTION

1. Technical Field

This invention relates to a transmission providing multiple forward and reverse speeds, and more particularly to a simple and yet rugged transmission of the layshaft and sliding gear type.

2. Background Art

Conventional gear transmissions are known which include an input shaft, an output shaft coaxial therewith, and a unidirectional layshaft having a plurality of speed change gears thereon parallel thereto. A reverse idler gear mechanism is usually employed therewith on a third axis to couple one of the layshaft gears to the output shaft and to reverse the direction of the output shaft. Unfortunately most of these prior transmissions provided only a single reverse speed for vehicular use.

Another disadvantage of some of these known layshaft gear transmissions is that they use shiftable elements for changing the gear ratios on both of the primary axes. Hence, the control mechanism for axially moving the shiftable elements has been unduly complicated.

Moreover, many more of these layshaft gear transmissions have used constant mesh gearing and dog clutches of the usual type to effect a gear speed change. These clutches are subject to failure because the associated elements are often engaged with the parts moving at nonsynchronous speeds and as a consequence they are continually being made more sophisticated and complex at additional cost in order to extend the service life of the transmission.

The sliding gear transmissions of U.S. Pat. Nos. 2,966,067 and 3,025,711 issued to R. Sommer on Dec. 27, 1960 and Mar. 20, 1962, respectively, have solved some of these problems. However, these referenced transmissions do not provide an engine driven power take-off (PTO) function, an output power path function along the layshaft axis, or a simple and effective bearing system to support the rotatable elements necessary to provide these two functions. Moreover, there is no provision for reducing the speed of the input shaft to facilitate shifting of the sliding gears.

The present invention is directed to one or more of the problems set forth above.

DISCLOSURE OF THE INVENTION

In one aspect of the invention a multiple speed gear transmission of the sliding gear type includes an input shaft on a first axis, a layshaft on a second axis having a plurality of drive gears connected for joint rotation therewith, first sliding gear means for selectively driving the layshaft in either direction of rotation, a tubular output shaft on the first axis, second sliding gear means for selectively connecting one of the drive gears drivingly to the tubular output shaft, and wherein the input shaft has a distal end portion serving as a power take-off (PTO).

The instant multiple speed forward and multiple speed reverse transmission is particularly used for a vehicle such as a track-type tractor. It can provide five forward and four reverse speeds, for example, or without a direct drive mode of operation can provide an equal number of forward and reverse speeds. A, a clutch is used for disengaging the input shaft from the power source and a brake is applied to the input shaft so that the shifting elements can be conveniently moved axially solely along the first axis and the change in gear ratio effected with minimum clashing.

Advantageously, the distal end of the input shaft serves as a power take-off (PTO), and it is encircled and supported by the output shaft which is substantially tubular. A pinion gear on the output shaft drives an output gear located on the axis of the layshaft, which output gear supports one end of the layshaft within it for compactness.

BRIEF DESCRIPTION OF THE DRAWINGS

FIG. 1 is a diagrammatic, vertically sectionalized, longitudinal elevational view of a multiple speed gear transmission constructed in accordance with the present invention; and FIG. 2 is a diagrammatic, fragmentary sectionalized elevational view of a reverse idler gear operatively associated with the multiple speed gear transmission of FIG. 1 on a laterally offset axis.

BEST MODE FOR CARRYING OUT THE INVENTION

Referring to FIG. 1, a multiple speed gear transmission 10 can be noted to include an elongate input shaft 12 disposed on an elevationally upper first axis 14 and a layshaft 16 disposed on a lower second axis 18 located in a vertical plane passing through the upper axis. The layshaft has a splined central portion 20, and front and rear cylindrical bearing portions 22,24 at the left and right ends thereof when viewing the drawing. A forward input gear 26, a reverse input gear 28, and speed gear means 30 are serially and releasably connected to rotate with the layshaft on its splined central portion.

The transmission 10 includes a housing generally identified by the reference numeral 32 which includes a front wall 34, a manifold and support member 36 releasably connected to the front wall, a bearing cage 38, a sump portion 40, and a rear wall 42. It can be noted from FIG. 1 that the sump portion is integral with the front wall, while the bearing cage 38 and the rear wall 42 are releasably connected thereto to facilitate servicing of the transmission.

A tubular output shaft 44 is rotatably supported in the housing 32 on the upper axis 14 and encircles the distal end of the input shaft 12. In the instant example a transfer pinion gear 46 is connected to the tubular shaft, and it is in constant mesh with an output gear 48 rotatably connected to the housing along the lower axis 18. An output yoke 50 is releasably connected to the output gear by a spline connection 52.

As shown in the fragmentary view of FIG. 2, a reverse idler gear 54 is rotatably connected to the front wall 34 of the housing 32 along a third axis 55 elevationally located intermediate the upper and lower axes 14,18 and laterally offset therefrom. Specifically, a cylindrical socket 56 is formed in the rear face of the front wall and receives a flanged bearing support member or auxiliary shaft 58 therein. An opposed pair of tapered roller bearings 60 are mounted on the support member and a fastener 62 passing through the support member is screwthreadably received in the front wall to secure the bearings in place. The reverse idler gear 54 is in constant mesh with the reverse gear 28 on the layshaft 16.

As is illustrated in FIG. 1, the input shaft 12 has a front spline 64, first and second cylindrical surfaces 66,68, a splined central portion 70 defining front and rear shoulders 72 and 74 at each end thereof, a cylindrical distal end portion 76, and a rear spline power take off (PTO) portion 78. A first coupling means 80 is nonrotatably and axially movably mounted on the splined central portion of the input shaft for drivingly connecting it to either the forward gear 26 or the reverse idler gear 54. The first coupling means disclosed is basically a drive pinion gear or first sliding gear 82 having an annular groove 84 therein, in which is received a first shifting fork 86.

The tubular shaft 44 has an external spline 88, a rear external bearing seat 90, and front and rear internal bearing seats 92,94 thereon. Second coupling means, identified generally by the reference numeral 96, are connected to the external spline of the tubular shaft for selectively connecting the gear means 30 thereto. Advantageously, the second coupling means 96 includes a first cluster gear 98 and a second cluster gear 100 nonrotatably but axially movably mounted on the splined portion 88 of the tubular shaft. The first cluster gear portion defines a first speed driven or sliding gear 102, a second speed driven or sliding gear 104, and an annular groove 106 for receiving a second shifting fork 108. Similarly, the second cluster gear defines a third speed driven or sliding gear 110, a fourth speed driven or sliding gear 112, and an annular groove 114 capable of receiving a third shifting fork 116. Immediately below the first and second cluster gears are the gear means 30 on the layshaft 16 including in serially related order fourth, third, second and first speed drive gears 118, 120, 122 and 124 respectively when reading from left to right in the drawing.

Still a third coupling means 126 is positioned adjacent the first coupling means 80 on the input shaft 12. The third coupling means includes an annular coupling element 128 defining an external groove 130 and an internal spline 132 selectively connectable directly with the external spline 88 of the tubular shaft 44. A fourth shifter fork 134 is received in the groove 130 and is effective to axially move the coupling element 128 along the splined central portion 70 of the input shaft so that the splines 132 and 88, and thus the input and tubular shafts 12 and 44, can be coupled together for a direct drive mode of operation.

Referring next to the bearing arrangement of the transmission 10, it can be seen that a first or front roller bearing assembly 136 is internally seated on the second cylindrical surface 68 of the input shaft 12 against the front shoulder 72. The first roller bearing assembly 136 is externally seated in a bore 138 defined in the front wall 34 and in the support member 36. Since the first roller bearing assembly is seated against a shoulder 140 of the support member the input shaft is limited in its forward axial movement. A centrally disposed thrust bearing 142 is seated against the rear shoulder 74 of the input shaft and serves to bear against the front end of the tubular shaft 44. A second or rear roller bearing assembly 144 is externally seated within the rear wall 42 of the housing 32 and is internally seated on the rear bearing seat 90 of the tubular shaft. Rightward movement of the tubular shaft is limited by the second roller bearing assembly, and rightward movement of the input shaft is limited by the thrust bearing 142 acting against the end of the tubular shaft. Front and rear sleeve bearings 146,148 are mounted on the bearing seats 92,94 within the tubular shaft for positive engagement and support with the distal end portion 76 of the input shaft.

Referring next to the lower axis 18, the output gear 48 is rotatably mounted on the rear of the housing 32 by a pair of opposed tapered roller bearing assemblies 150,152. The rear wall 42 supports the rear bearing assembly 150 and a projecting bracket or cage 154 extending from the rear wall supports the front bearing assembly 152. A sleeve bearing 156 mounted within the hollow output gear is seated on the rear bearing portion 24 of the layshaft 16 for supporting it positively thereat. Another pair of opposed tapered roller bearing assemblies 158,160 are seated within the bearing cage 38 and upon the front bearing portion 22 of the layshaft. A retaining cap 162 and one or more fasteners 164 are used to retain the front bearing assemblies on the layshaft.

In the present example the input shaft 12 is rotatably driven by an engine, not shown, through clutch means 166. The clutch means includes a clutch housing 168 driven by an engine flywheel 170, a hydraulically actuated annular piston 172 defining an actuating chamber 174 with the clutch housing, and a plurality of interleaved annular plates and/or discs 176 alternately coupled to the clutch housing and to a hub 178. The hub is connected to the front splines 64 of the input shaft, so that when the piston is moved to the left when viewing the drawing by hydraulic pressure in the usual manner the clutch plates are clamped together and the flywheel and input shaft are coupled together for joint rotation. A ball bearing assembly 180 supports the clutch housing on the support member 36.

A pump drive gear 181 is advantageously connected to the clutch housing 168 so that it is continually driven by the engine of the vehicle. This pump drive gear powerably operates a pump of the usual type, not shown, for supplying oil to the controls of the transmission 10, oil to other controls of the vehicle, and oil to the transmission for lubrication purposes.

The transmission 10 also includes brake means 182 for stopping rotation of the input shaft 12 when the clutch means 166 is disengaged. In the instant embodiment the brake means includes one or more pistons 184 received in a releasable brake housing 186 and defining an actuating chamber 188 therebetween. A pair of brake pad assemblies 190 associated with each piston are nonrotatably, but axially movably connected to the front wall 34 of the housing 32 and to the brake housing by pins or the like, not shown, and are adapted to clamp an annular axially movable plate 192 therebetween. The plate 192 is nonrotatably connected to the splined central portion 70 of the input shaft, so that with hydraulic fluid under pressure being directed to the chamber 188 the piston can move leftwardly to clamp the plate between the pad assemblies and stop rotation of the input shaft. Both the brake piston 184 and the clutch piston 172 are preferably disengaged by one or more springs of the usual type, not shown, with it being appreciated that the operation of the brake and clutch are well known in the art.

INDUSTRIAL APPLICABILITY

In operation, the transmission 10 is effective to provide five forward and four reverse speeds particularly useful for a track-type earthmoving tractor.

First forward gear is obtained by moving the first shifting fork 86 rightwardly of the position illustrated to engage sliding gear 82 with forward input gear 26 and by moving the second shifting fork 108 rightwardly to engage the first speed sliding gear 102 with the first speed drive gear 124. This is accomplished with the clutch means 166 disengaged and the brake means 182 engaged so that the shift is made at substantially synchronous or zero speed. In other words the rotation of the input shaft 12 is brought substantially to a stop while the rotation of the output yoke 50 and thus the tubular shaft 44 continuously connected thereto is simultaneously brought substantially to a stop by the application of the vehicle's service brakes, not shown. Upon the subsequent release of the brake means and engagement of the clutch means the layshaft 16 is driven at a speed reduction of about 1.83 via the gears 82,26, and the tubular shaft 44 is driven at an additional speed reduction of about 1.83 via the gears 124,102. The ratio of the continuously connected gears 46,48 provides a further reduction of about 1.68, so that the output yoke 50 is driven at an overall speed reduction of about 5.59 with respect to the input shaft.

Second gear is achieved by simply urging the second shifter fork 108 to the left with the clutch means 166 disengaged and brake means 182 engaged as before, disengaging gears 102,124 and engaging gears 104,122. This gives a speed reduction of about 1.33 therebetween and an overall reduction at the output yoke 50 of about 4.08.

Third gear is provided by centering the second shifter fork 108 in its neutral position as illustrated and urging the third shifter fork 116 to the right from the location shown to engage the third speed drive gear 120 with the driven gear 110. This achieves a speed reduction of about 0.97 therebetween and an overall reduction of about 2.97.

Moving the third shifter fork 116 fully to the left will similarly engage the fourth speed drive gear 118 with the driven gear 112 to achieve a speed reduction of about 0.70 and an overall reduction of about 2.15.

A fifth or direct drive speed is achieved by centering the shifter forks 86, 108 and 116 and by moving the fourth shifter fork 134 to the right in order to couple the splines 132 and 88 directly together and cause the tubular shaft 44 to rotate jointly with the input shaft 12. Thus the yoke 50 rotates at a reduction of about 1.68.

The plurality of reverse speeds are obtained by shifting the drive pinion gear 82 to the left or forwardly of the position illustrated by corresponding displacement of the first shifter fork 86. This couples the pinion gear 82 directly with the reverse idler gear 54 as can be appreciated by reference to FIG. 2. Since the reverse idler gear is in constant mesh with the reverse input gear 28, the layshaft is then driven at a speed reduction of about 1.48 with respect to the input shaft and in the same relative direction of rotation. Each of the gear means 30 can be individually engaged to provide the same speed reduction ratios as the first four forward speeds between the layshaft 16 and the tubular shaft 44.

Thus it can be recognized that the transmission 10 is compact and reliable in its construction, and is adaptable to provide a plurality of forward and a plurality of reverse speeds using elements disposed on two primary axes and on a reverse idler gear axis. In the example illustrated, five forward and four reverse speeds are obtained using only twelve gears and four easily shifted coupling elements 82, 98, 100 and 128. Moreover, the coupling elements are all associated with the upper shafts 12,44 so that they are accessible and conveniently axially movable from the top of the housing 32 by a conventional control mechanism, not shown. Advantageously, the input shaft is brought to a stop by disengaging the clutch means 166 and engaging the brake means 182 during each gear shift and with the output of the transmission also being substantially brought to a stop by application of the service brakes of the vehicle to thus extend the service lives of the interengaging elements.

If the direct drive coupling means 126 is not used, four forward and four reverse speeds are possible with the transmission 10 by using only three shifter forks 86, 108 and 116 for axially moving five sliding gears 82, 102, 104, 110 and 112 solely along the upper axis 14. A major feature is the direct connection of juxtaposed sliding gears 102 and 104 to form an integral cluster gear 98. With the bidirectional movement of single shifter fork 108 from its centered or neutral position two speed shifts can be made. The favorable disposition of sliding gears 110 and 112 allows two more speed shifts through a second integral cluster gear 100 using the repeated feature. Although not shown, it is contemplated that third, fourth or more integral cluster gears can be coupled to the tubular shaft and used in conjunction with additional and appropriately sized pairs of speed drive gears on the layshaft 16 to provide six, eight or more forward and reverse speeds.

Still further, the bearing system for supporting the input shaft 12, the tubular shaft 44, the layshaft 16 and the output gear 48 is also simple and reliable, and the input shaft is elongated to extend rearwardly beyond the tubular shaft to provide an effective PTO drive connection.

Other aspects, objects and advantages will become apparent from a study of the specification, drawings and appended claims.

I claim:

1. A multiple speed gear transmission of the sliding gear type comprising:
   an input shaft disposed on a first axis and having a distal end portion serving as a power take-off;
   a layshaft disposed on a second axis and having a plurality of drive gears connected for joint rotation therewith;
   first sliding gear means for selectively driving the layshaft in either direction of rotation in response to unidirectional rotation of the input shaft;
   a tubular output shaft disposed on the first axis and receiving the distal end portion therewithin;
   second sliding gear means for connecting one of the drive gears drivingly to the tubular output shaft;
   an output gear rotatably supported on the second axis; and
   output means for connecting the tubular output shaft drivingly to the output gear.

2. The transmission of claim 1 including a housing, first bearing means for rotatably supporting the output gear in the housing, and second bearing means for rotatably supporting the layshaft in the output gear.

3. The transmission of claim 1 wherein the output means includes a pinion gear connected to the tubular output shaft and being in constant mesh with the output gear.

4. The transmission of claim 3 including a sleeve bearing for rotatably supporting one end of the layshaft in the output gear.

5. The transmission of claim 4 including tapered roller bearing assembly means for rotatably supporting the other end of the layshaft.

6. The transmission of claim 3 including means for releasably coupling an output member to the output gear along the second axis.

7. The transmission of claim 1 including a bearing connected between the input shaft and the tubular output shaft.

8. A multiple speed gear transmission of the sliding gear type comprising:
- an input shaft disposed on a first axis and having an end portion;
- a layshaft disposed on a second axis and including a forward gear, a reverse gear and first and second drive gears connected for joint rotation therewith;
- a reverse idler gear disposed on a third axis in constant mesh with the reverse gear;
- first sliding gear means for selectively driving one of the forward gear and the reverse idler gear and thereby the layshaft in either direction of rotation in response to rotation of the input shaft;
- a tubular output shaft disposed on the first axis;
- bearing means for rotatably connecting end portion of the input shaft within the tubluar output shaft, the end portion of the input shaft being accessible for power take-off purposes;
- second sliding gear means for selectively connecting one of the first and second drive gears drivingly to the tubular output shaft; and
- third sliding gear means for directly connecting the input shaft to the tubular output shaft for conjoint rotation.

* * * * *